J. FOX.
Mower.
No. 69,908.
Patented Oct. 15, 1867.
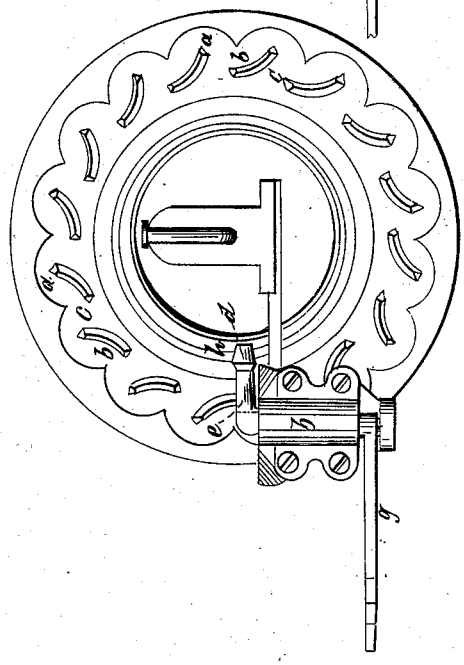
Witnesses.
F. Smith
S. E. Jones
Inventor.
John Fox
by atty Thos T Everett

United States Patent Office.

JOHN FOX, OF BALTIMORE, MARYLAND.

Letters Patent No. 69,908, dated October 15, 1867.

IMPROVEMENT IN HARVESTERS.

The Schedule referred to in these Letters Patent and making part of the same.

TO ALL WHOM IT MAY CONCERN:

Be it known that I, JOHN FOX, of the city of Baltimore, in the State of Maryland, have invented a certain new and useful Improvement in Harvesters; and I do hereby declare the following to be a full, clear, and exact description of the construction and operation of the same, reference being had to the accompanying drawings, and to the letters and marks thereon.

My improvement has reference to that kind of harvester where, by a cam-groove, or its equivalent, in the face of the driving-wheel, a lever with a roller on its end is actuated to move the cutter-bar. A harvester of this construction was patented to B. F. Ray, on the 15th day of February, 1859, the roller on the lever and fitting into the cam-groove being conical. Heretofore the cam-groove has been with both of its surfaces or sides continuous, so that in backing the machine the lever would be kept in motion as much as when the machine was moving forward.

The object of my invention is to avoid the motion of the lever when the machine is being backed, or when it is not used, and yet drawn forward, and this I effect by having the inner surface of the cam-groove broken or interrupted at one, two, or more points on its line. The drawings forming part of this specification show how my invention can be applied to the harvester of the kind referred to.

Figure 1 of these drawings is an inner side or face view of a driving-wheel with the cam-groove lever and roller, the parts being represented with the lever thrown out of gear, while Figure 2 is a view of a part of the wheel and lever with the roller in gear.

The inner surface of the cam-groove, instead of being continuous as is its outer surface $a$, is broken or interrupted by having certain flanges $b$ with spaces $c$ between them. These flanges may be of the number here shown, or there may only be two or three of them at certain points in the line of the cam-groove. The friction-roller $d$ is on the end of the lever $e$, the lever being so formed as to pass down through the box $f$, and continuing on as indicated at $g$, the outer end being attached to the cutter-bar when the machine is in use, and being drawn forward the roller will move in the cam-groove, as is shown by fig. 2, but on backing the machine it will pass out of the groove through the space $c$ and rest upon the surface $h$. Upon the forward movement of the machine the roller will again pass into the cam-groove, or if the end of the lever $g$ be detached from the cutter-bar the roller can be left on the surface $h$.

What I claim as my invention, and desire to secure by Letters Patent, is—

The broken or interrupted surface of the cam-groove on the inner face of the driving-wheel for actuating the roller and lever, substantially as herein recited.

This specification signed this 11th day of April, 1867.

JOHN FOX.

Witnesses:
    THOS. T. EVERETT,
    T. SMITH.